United States Patent [19]

Lockwood et al.

[11] Patent Number: 5,182,125
[45] Date of Patent: * Jan. 26, 1993

[54] PRODUCT PRODUCED BY PROCESS OF FREEZING AND ICE GLAZING BROCCOLI

[75] Inventors: Dean H. Lockwood, Burnsville; William G. Schmidt, Maple Grove; Jeffrey D. Carter, Circle Pines, all of Minn.

[73] Assignee: The Pillsbury Company, Minneapolis, Minn.

[*] Notice: The portion of the term of this patent subsequent to Jun. 25, 2008 has been disclaimed.

[21] Appl. No.: 691,381

[22] Filed: Apr. 25, 1991

Related U.S. Application Data

[63] Continuation of Ser. No. 504,338, Apr. 4, 1990, Pat. No. 5,026,562.

[51] Int. Cl.⁵ .............................................. A23B 7/04
[52] U.S. Cl. ......................................... 426/68; 426/615
[58] Field of Search ............ 426/393, 100, 102, 524, 426/68, 327, 615, 302, 419

[56] References Cited

U.S. PATENT DOCUMENTS

| 161,596 | 4/1875 | Davis et al. ................... 426/393 |
| 709,751 | 9/1902 | Davis . |
| 1,388,298 | 8/1921 | Petersen . |
| 1,487,883 | 3/1924 | Petersen ........................ 426/524 |
| 1,520,811 | 12/1924 | Davis . |
| 1,924,903 | 8/1933 | Birdseye . |
| 1,969,832 | 8/1934 | Beard . |
| 2,093,069 | 9/1937 | Bedford . |
| 2,194,684 | 3/1940 | Bedford . |
| 2,385,140 | 9/1945 | Knowles ....................... 62/173 |
| 2,480,082 | 8/1949 | Lowry et al. . |
| 2,504,869 | 4/1950 | Noyes . |
| 2,974,497 | 3/1961 | Carpenter et al. ............... 62/63 |
| 3,022,175 | 2/1962 | Wakefield . |
| 3,719,138 | 3/1973 | Blaetz et al. . |
| 3,868,470 | 2/1975 | Fallon et al. ................... 426/302 |
| 4,361,016 | 11/1982 | Multack ....................... 62/374 |
| 4,547,380 | 10/1985 | Bengtsson et al. .............. 426/302 |
| 5,026,562 | 6/1991 | Schmidt et al. ................. 426/524 |

FOREIGN PATENT DOCUMENTS 4714893 5/1972 Japan ................................ 426/100

Primary Examiner—Steven Weinstein
Attorney, Agent, or Firm—Kinney & Lange

[57] ABSTRACT

A product produced by the process of forming an ice glazing within the canopy of broccoli florets to preserve the floret structure and reduce fines loss is disclosed. The process includes the steps of individually freezing the broccoli florets, and immersing the florets in water at a water temperature and for an amount of time sufficient to form an ice glazing within the structure of the floret. The floret is then refrozen. The product has a glazing which preserves the structure of the floret during processing and subsequently handling. A frozen broccoli floret having an ice glazing within the crevices of the floret is also disclosed.

2 Claims, 3 Drawing Sheets

PRODUCT PRODUCED BY PROCESS OF FREEZING AND ICE GLAZING BROCCOLI

This application is a continuation of U.S. patent application Ser. No. 07/504,338, filed Apr. 4, 1990 having the title "Method of Freezing and Ice Glazing Broccoli", now issued U.S. Pat. No. 5,026,562.

BACKGROUND OF THE INVENTION

The present invention relates to the processing of frozen vegetables. In particular, it relates to a method of processing frozen vegetables having a delicate structure in a manner which protects the structure and reduces breakage during processing and subsequent handling.

The demand for high quality, nutritious, and aesthetically pleasing frozen foods has increased dramatically in recent years. Consumers demand frozen foods which are pleasing to the eye, are high in nutrient value, and are conveniently packaged. Manufacturers of frozen foods have found it necessary to improve product quality and at the same time reduce costs to effectively compete in the increasingly competitive frozen food market.

An example of a frozen vegetable which is very popular with consumers is frozen broccoli. The portion of the broccoli plant which has the greatest appeal to consumers is the delicate broccoli floret. Broccoli florets have a fragile structure and are susceptible to breakage during processing, handling and shipping.

One technique currently used for processing a variety of frozen vegetables is the individual quick freeze ("IQF") method. IQF vegetables are separated and frozen individually by a variety of methods such as spreading the vegetables out on sheets and placing the sheets in a freezer, or by agitating the vegetables during freezing. Consumers have long preferred IQF vegetables over vegetables which are frozen collectively in a block.

Frozen IQF vegetables do not stick together in a storage container. Consumers prefer IQF vegetables because any size portion can be prepared, and because the vegetables are free flowing and are easy to remove from the package.

A patent which illustrates the preparation of IQF vegetables is Fallon et al. U.S. Pat. No. 3,868,470. The Fallon et al. patent discloses a method of applying a viscous coating containing a seasoning to IQF vegetables. Presently, manufacturers of IQF vegetable products apply an ice glazing to some vegetables to preserve the freshness of the product. Knowles U.S. Pat. No. 2,385,140 illustrates that it is known in the art to apply an ice coating to the surface of a vegetable in order to prevent oxidation and to protect the surface from exposure to microorganisms, such as fungi.

The method disclosed in Knowles is a process of preparing vegetables including the steps of freezing a vegetable, placing the frozen vegetables on a shaker, applying a quantity of water while shaking the vegetables to form an ice glaze, and then refreezing the glazed vegetable. The specific vegetables mentioned in this reference are peas, beans, and any vegetable which may be moved along by the action of a shaker. See Col. 4, lines 53-57.

The handling method disclosed in Knowles U.S. Pat. No. 2,385,140 for ice glazing vegetables is not suitable for handling broccoli florets because the shaking action of the screen fractures the delicate floret structure. The shaking action also causes an excessive amount of fines loss. "Fines" for purposes of this disclosure are defined as portions of the floret structure which break off during processing.

Manufacturers of IQF broccoli have found that by using current handling techniques, the floret structure is damaged, and a significant amount of fines are generated during packaging, transport, and handling. Before the present invention, manufacturers have not discovered methods to preserve the floret structure and reduce the amounts of fines generated during the preparation of frozen broccoli florets.

SUMMARY OF THE INVENTION

The present invention provides a method of protecting the delicate structure of a broccoli floret while also providing a more aesthetically pleasing frozen broccoli product and reducing fines loss in the manufacture of frozen broccoli. The method includes individually freezing the broccoli florets and immersing the frozen florets in water in a manner which forms an ice glaze within the crevices of the canopy structure. The florets are submerged for an amount of time sufficient to form enough glazing to strengthen the delicate structure of the floret. The temperature of the bath is selected to minimize product thawing.

The method of the present invention provides a more rigid and durable floret, and provides other advantages as well. For example, it has been discovered that the glazing within the crevices of the canopy structure results in improved crispness in the cooked vegetable. Broccoli prepared according to the method of the present invention also has a color that is a brighter shade of green, and has a longer shelf life than the prior art IQF broccoli.

In the practice of the present invention, the preferred amount of ice glazing is between about eight and about twelve percent of the weight of the glazed floret. Amounts of glazing between about eight and about twelve percent by weight protects the buds from fracture, and prevents the buds from detaching from the stem pedicels during further processing. The disclosed method advantageously reduces broccoli floret fines loss during manufacturing compared to current handling techniques.

DETAILED DESCRIPTION OF THE PREFERRED EMBODIMENTS

The present invention is an improved method of forming an individually quick frozen ("IQF") vegetable product having a protective ice glazing for the delicate structure of the vegetable. The glazing preserves the structure of the vegetable, and reduces fines loss during handling.

The following definitions are provided to precisely describe the present method.

A "broccoli floret" for purposes of this disclosure is defined as the uppermost portion of the stalk of a broccoli plant containing a number of stems which support immature flowers, or buds. Each bud is attached to a pedicel.

A "pedicel" is defined as a structure located on the terminal portion of the stem which secures the bud to the stem. Each stem may have several pedicels and attached buds.

The "canopy" for purposes of this disclosure is the portion of the floret including the buds, pedicels and uppermost portion of the stems which together form a structure covering the uppermost portion of the stalk.

"Fines" for purposes of this disclosure are portions of the broccoli floret such as the buds, for example, which break off during processing.

The present invention provides a method of preserving the structure of a vegetable having a fragile structure which is subject to breakage during processing. The method is well suited for preserving the structure of a broccoli floret, but may be used to preserve the structure of other types of fragile vegetables such as cauliflower and asparagus, for example.

The ice glazing formed in accordance with the present invention surprisingly protects the fragile structure of the vegetables from mechanical damage. A protected structure may be handled with less care during further handling steps such as sorting, packaging, transport, shelf stocking, and transfer to a freezer, for example, without causing excessive breakage. A vegetable with a well preserved structure is more aesthetically pleasing to the consumer, and is more desirable for the manufacturer who experiences fewer fines loss during processing and later handling steps.

Consumers prefer broccoli florets having a preserved structure because intact florets have a more aesthetically pleasing appearance. Also, fines generated after packaging broccoli are very small and normally wash through a strainer instead of being consumed. The method of the present invention vastly improves the quality of the ultimate product which is cooked broccoli florets.

Figure 1:
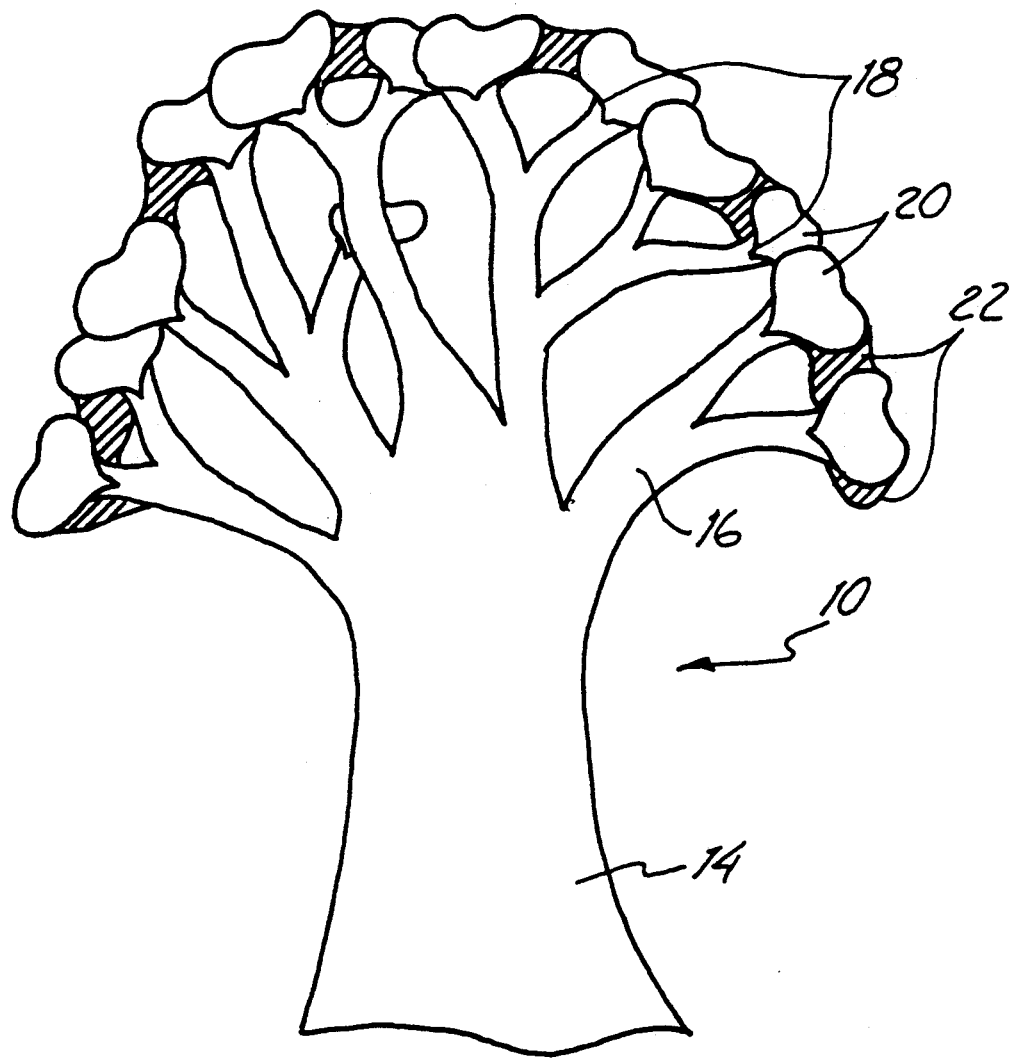
FIG. 1 is a cross-sectional view of a broccoli floret prepared according to the method of the present invention.

FIG. 1 illustrates the structure of an IQF broccoli floret 10 having an ice glazing produced according to the method of the present invention. The floret 10 includes a stalk 14, and a plurality of attached stem portions 16. Each stem portion 16 terminates at a stem pedicel 18. Each pedicel 18 supports a bud 20. Each stem portion 16 may have one or more pedicels 18, and a bud 20 attached to each pedicel 18.

The preferred embodiment of the present invention is a novel method of forming a uniform ice glaze 22 within the crevices of the canopy of the floret 10. The glazing reinforces and strengthens the canopy—protecting the stem portions 16 from fracture, the buds 20 from severing from the pedicels 18, and the buds 20 from fracture while presenting an aesthetically pleasing broccoli floret.

The method of the present invention advantageously reduces fines loss in the manufacture of frozen broccoli florets, as compared to fines loss for unglazed IQF broccoli florets, and minimizes the degree of thawing of the florets during glazing. Minimizing thawing has the advantage of minimizing the amount of energy required to form the ice glazing. Minimizing thawing also preserves freshness and improves the appearance of the frozen vegetable.

Figure 2:
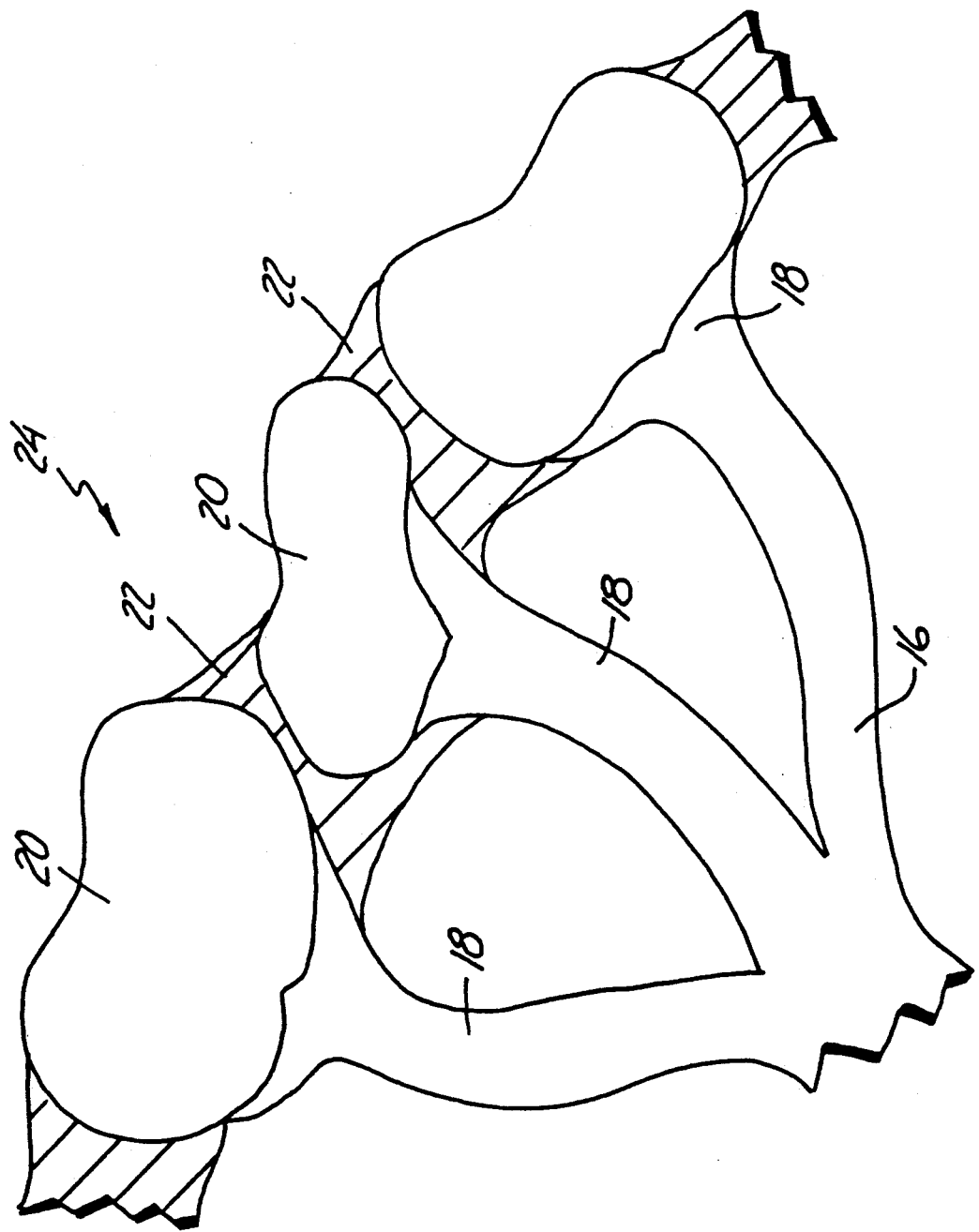
FIG. 2 is an enlarged cross-sectional view of the canopy structure of a broccoli floret after glazing.

An enlarged cross-sectional view of a canopy 24 glazed according to the method of the present invention is shown in FIG. 2. Between the buds 20 (before glazing) are a plurality of irregularly shaped crevices which trap water when the floret is immersed in water. After glazing, a layer of ice 22 forms within the cavities of the canopy 24, forming a broccoli floret with a preserved structure.

Figure 3:
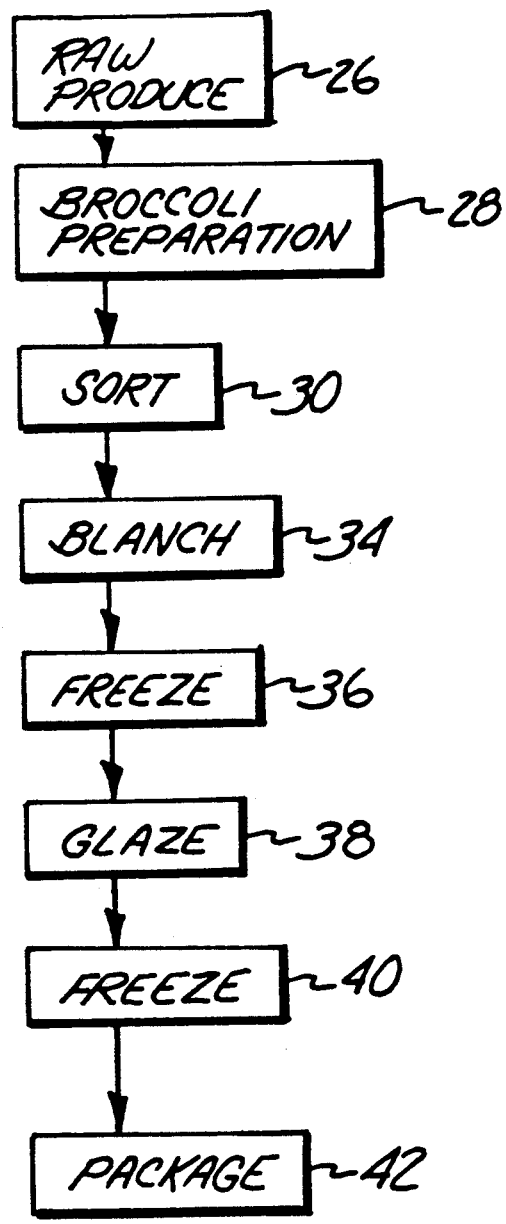
FIG. 3 is a flow diagram illustrating a preferred method of preparing ice glazed broccoli.

FIG. 3 is a flow diagram illustrating the preferred method of preparing ice glazed broccoli. The preferred method uses raw broccoli as a starting material as represented at 26. The broccoli is first prepared for processing by washing and cutting according to methods known in the art as represented at 28. The broccoli is then sorted (30) into various food product grades. For example, broccoli spears are separated from broccoli florets and stalk portions. In another example, the stalk portions are separated from the florets. The most preferred method includes sorting the broccoli florets from the cut stalk portions.

The freshly cut and cleaned broccoli florets are blanched (34), then placed in a freezer and individually quick frozen ("IQF") as represented at 36. The IQF broccoli florets are preferably chilled to a temperature of about 0 degrees Fahrenheit. An acceptable temperature range is between about −5 degrees Fahrenheit and about +15 degrees Fahrenheit. The most preferred temperature range is between about −5 and about +5 degrees Fahrenheit. (The freezing point of broccoli florets is about 29.1 degrees Fahrenheit.) The florets are frozen completely, which is critical to the present method of forming the protective ice glaze.

The IQF florets are next glazed as represented at 38. The preferred method includes submerging the florets in water contained in a dip tank at a temperature between about 45 degrees Fahrenheit and about 70 degrees Fahrenheit, with a preferred temperature of about 55 degrees Fahrenheit for about one second or less. The temperature of the water is selected such that an ice glazing forms within the crevices of the canopy in about a second. Temperatures warmer than the stated range are unacceptable because the glazing will not form within the florets. Temperatures colder than the stated range are also undesirable for use with broccoli florets because the resulting ice glaze does not penetrate the canopy 24, and the ice 22 does not form in the crevices. Ice formation within the crevices in accordance with the present invention is shown in FIG. 2.

Formation of an ice glazing on the outermost surfaces of the canopy (rather than within the crevices) does not adequately protect the delicate structure of the floret. The ice-coated floret is almost as susceptible to mechanical damage as an unglazed IQF floret. A glazing formed on the outer surfaces of the floret also requires greater energy consumption to form the glaze and adds unnecessary weight to the product. Such an ice glazing has also been found to rehydrate in the freezer and refreeze on the freezer coils.

By forming an ice glaze within the crevices of the floret amounting to between about eight and about twelve percent by weight of the ice glazed floret, it was surprisingly discovered that fines loss was dramatically reduced to about 1.6 percent by the weight of the unglazed floret. The most preferred amount of ice glazing is about ten percent.

Although other methods of applying water to IQF broccoli florets are contemplated such as spraying, for example, it was discovered that submerging the floret in water produced a glazing located in the crevices of the canopy, and did not produce a significant amount of glazing on any other part of the floret. Although the mechanism is not precisely understood, it is believed that the physical structure of the canopy traps the ice as it forms, while the ice forming on the outer surfaces of the floret slides off.

The amount of fines loss is a direct reflection of the durability of the structure of the floret. Amounts of ice glazing as little as eight percent by weight of the glazed floret significantly reduced fines loss, and improved the structural strength of the florets. It was discovered that an amount of ice less than about eight percent by weight of the glazed floret was unacceptable because the volume of the ice was insufficient to fill the crevices of the canopy.

It is necessary to add make-up water to the dip tank (not shown) as the water in the tank is consumed when the ice glaze is formed within the florets. The preferred dipping step is continuous, and a continuous water supply must be added to the dip tank to maintain a constant tank level, and to replace the water in the tank periodically. The dip tank used in the preferred method is equipped with a heater to compensate for heat transferred to the broccoli florets during glazing, and with a process controller for maintaining the water temperature at about 55 degrees Fahrenheit.

In order to minimize the risk of bacterial growth, the water flow rate into the dip tank is preferably adjusted to replace between about 12% and about 25% of the tank volume each hour. One preferred replacement rate is about 25% of the volume per hour. For this reason, the glazing method of the present invention may generate a waste stream of water leaving the dip tank.

In the most preferred embodiment of the present method, the water flow rate is adjusted to achieve a liquid turnover rate of about 12.5% of the tank volume per hour. With low replacement rates, it is necessary to inject an antimicrobial agent such as chlorine ga into the water to inhibit microbial action. When chlorine is used as the antimicrobial agent, it is necessary to inject between about 1 and about 3 p.p.m. into the water. The preferred water turnover rate should be at least equal to about 25% of the tank volume per hour if no antimicrobial agent is added.

The most preferred method also includes exposing the surface of the water in the dip tank to ultraviolet radiation. UV exposure is believed to further inhibit microbial growth.

Because some fines break off during the glazing step, the dip tank used to carry out the preferred method is equipped with a device which removes fines. The preferred glazing method generates a waste stream including broccoli floret fines leaving the dip tank.

After the broccoli florets are glazed, the florets are refrozen as represented at 40 in FIG. 3. The glazed florets are transferred according to the preferred method to a freezer on a continuous, moving screen. The screen allows excess water to escape from the florets. An air suction fan (not shown) is provided to aid in removing excess water from the glazed broccoli florets. The suction fan is positioned below the screen to pull air and water in a downward direction, normal to the surface of the screen.

In a continuous glazing process, it is critical to maintain a constant broccoli feed rate in order to achieve efficient freezing. The most preferred method of freezing includes transferring the glazed florets onto the screen mentioned above in a single layer to a freezer which is maintained at about −20 degrees Fahrenheit, and which has about 500 linear ft/min of air movement. The most preferred method of transfer employs a continuous screen which does not vibrate. The florets are refrozen until the center of the floret reaches an internal temperature of between +5° F. and −5° F., with a preferred temperature of about 0° F. If a freezer which has an internal temperature of −20 degrees Fahrenheit, having 500 ft/min air movement is employed at the freezing station 40, a preferred retention time in the freezer of between about three and about five minutes is sufficient to reduce the internal temperature of the glazed florets to about zero degrees Fahrenheit. The maximum retention time required is about ten minutes.

The glazed, frozen broccoli florets are then packaged (42) according to known methods. Although the most preferred method includes packaging a plurality of glazed florets as a finished product, the present method includes combining the glazed florets with other products such as broccoli stalk portions, other frozen vegetables, sauces and meat, for example.

The present method provides several advantages to consumers as well as producers of frozen foods. The method preserves the structure of the floret, thus providing a cooked vegetable dish having improved appearance, which is important to many consumers. In particular, the florets retain a majority of the buds and stems, and the original shape. Broccoli florets formed according to the present method also have a more brilliant green color, better crispness, and an improved shelf life. The most preferred method also provides a cost savings to the manufacturer because waste broccoli floret fines are reduced to about 1.6 percent of the weight of the floret before glazing.

In order to greater appreciate the inventive aspects of the method of the present invention, an example is provided:

EXAMPLE 8000 pounds per hour of washed, cut broccoli florets were individually quick frozen (IQF) according to a known method. The florets were frozen throughout, and chilled to a temperature of about 0 degrees Fahrenheit. The IQF florets were fed at a constant rate of about 8000 lb/hr into a dip tank having a water temperature of about 55 degrees Fahrenheit. The dip tank volume in this example was approximately 960 gallons. The florets remained in contact with the dip tank water for about one second, until an ice glaze of about 10 percent by weight of the glazed floret was formed within the crevices of the canopy. The glazed florets were then transferred by a conveyor having a belt formed from a continuous screen to a freezer. The rate of transfer of the glazed florets was about 8800 lb/hr. As the glazed florets exited the dip tank, they were arranged in a single layer. A suction blower removed excess liquid from the florets.

It was necessary to add about 120 gallons per hour make-up water to the dip tank to maintain a constant level in the tank, to make up for water which formed the ice glaze, and to achieve a large enough turnover rate to minimize microbial activity. As fines were severed from the florets during glazing, they were removed from the dip tank. Chlorine was injected into the dip tank water in an amount of about 2 p.p.m. to inhibit microbial activity.

The glazed florets were transferred on the same conveyor belt in a single layer into a freezer having a gaseous air atmosphere maintained at about −20 degrees Fahrenheit. The gaseous air atmosphere moved at a linear velocity of about 500 feet per minute. The belt speed was set to achieve about a three minute retention time in the freezer. The glazed, individually frozen florets exited the freezer at a rate of about 8659 lb/hour, glazed weight having an internal temperature of about 0 degrees Fahrenheit.

The resulting floret structure was well preserved, and the fines loss during handling as compared to unglazed frozen broccoli was reduced. The total fines loss for this example was about 128 lb/hr.

Although the present invention has been described with reference to preferred embodiments, workers skilled in the art will recognize that changes may be made in form and detail without departing from the spirit and scope of the invention.

What is claimed is:

1. An ice glazed frozen broccoli floret product having a stalk, a plurality of stems extending from the stalk, a plurality of pedicels proximate an end of each stem, and a plurality of buds attached to the pedicels, and having a plurality of areas surrounding the adjacent buds, pedicels and a portion of the stems defining a plurality of crevices, the floret having an irregularly shaped outer surface, and having an ice glazing substantially filling the crevices, with an insignificant amount of ice glazing being present on the irregularly shaped outer surface of the floret, the glazing being at least about 8 percent by weight of the frozen floret.

2. A product produced by a process of forming a frozen broccoli product comprising individual broccoli florets having a floret structure including an irregularly shaped exterior surface, a plurality of stems, each stem having at least one pedicel, and a plurality of buds attached to the stem pedicels, and an area between the uppermost portions of the adjacent stems, pedicels, and between attached buds defining a plurality of crevices, the process comprises:

individually quick freezing each of said broccoli florets such that each floret is completely frozen throughout;

immersing each frozen broccoli floret in water for a length of time and at a water temperature sufficient to form an ice glaze within said crevices of the floret comprising at least about 8% by weight of the glazed frozen floret and such that the ice glaze substantially fills the crevices, and such that an insignificant amount of ice glaze is present on the exterior surface of the floret after the floret is removed from the water; and then refreezing said ice glazed florets.

* * * * *